US010496194B2

(12) United States Patent
Miller et al.

(10) Patent No.: US 10,496,194 B2
(45) Date of Patent: Dec. 3, 2019

(54) SYSTEM AND METHOD FOR PROVIDING ABSOLUTE COORDINATE AND ZONE MAPPING BETWEEN A TOUCHPAD AND A DISPLAY SCREEN

(71) Applicant: Honda Motor Co., Ltd., Tokyo (JP)

(72) Inventors: Ross Cameron Miller, Hilliard, OH (US); Parhys Napier, Hilliard, OH (US); Cody D. Grebe, Marysville, OH (US); David Albert Vanderburgh, Dublin, OH (US); Steven Feit, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/712,177

(22) Filed: Sep. 22, 2017

(65) Prior Publication Data

US 2018/0024659 A1 Jan. 25, 2018

Related U.S. Application Data

(63) Continuation of application No. 15/633,809, filed on Jun. 27, 2017, now Pat. No. 10,037,091, which is a
(Continued)

(51) Int. Cl.
*G06F 3/0354* (2013.01)
*G06F 3/14* (2006.01)
(Continued)

(52) U.S. Cl.
CPC .......... *G06F 3/03547* (2013.01); *B60K 37/02* (2013.01); *G06F 3/0416* (2013.01);
(Continued)

(58) Field of Classification Search
CPC ....... G06F 3/0416; G06F 3/0488; G06F 3/044
See application file for complete search history.

(56) References Cited

U.S. PATENT DOCUMENTS 4,782,327 A  11/1988  Kley et al.
5,327,161 A   7/1994  Logan et al.
(Continued)

FOREIGN PATENT DOCUMENTS

CN    1782975    6/2006
CN  101963857    2/2011
(Continued)

OTHER PUBLICATIONS

Office Action of U.S. Appl. No. 14/547,211 dated May 25, 2016, 28 pages.
(Continued)

*Primary Examiner* — Ryan A Lubit
(74) *Attorney, Agent, or Firm* — Rankin, Hill & Clark LLP

(57) ABSTRACT

A method and system for providing absolute coordinate mapping using zone mapping input in a vehicle includes determining a touch input received on a touchpad located in the vehicle, presenting an absolute mapped position of the touch input on a display screen located in the vehicle, presenting one or more user interface objects on the display screen, and providing a plurality of display input zones corresponding to one or more user interface objects presented on the display screen. The method and system further include determining a user input to one of the one or more user interface objects presented on the display screen based on the absolute mapped position of the touch input on at least one of the one or more user interface objects presented on the display screen, and the plurality of display input zones on the display screen.

20 Claims, 5 Drawing Sheets

Related U.S. Application Data continuation of application No. 14/547,211, filed on Nov. 19, 2014, now Pat. No. 9,727,231.

(51) Int. Cl.
  *G06F 3/041* (2006.01)
  *G06F 3/0488* (2013.01)
  *B60K 37/02* (2006.01)

(52) U.S. Cl.
  CPC .............. *G06F 3/0488* (2013.01); *G06F 3/14* (2013.01); *B60K 2370/1442* (2019.05)

(56) References Cited

U.S. PATENT DOCUMENTS

| | | | |
|---|---|---|---|
| 5,617,117 | A | 4/1997 | Kataoka et al. |
| 6,029,214 | A | 2/2000 | Dorfman et al. |
| 6,043,818 | A | 3/2000 | Nakano et al. |
| 6,262,717 | B1 | 7/2001 | Donohue et al. |
| 6,559,833 | B2 | 5/2003 | Rowe |
| 6,750,803 | B2 | 6/2004 | Yates et al. |
| 6,765,557 | B1 | 7/2004 | Segal et al. |
| 7,889,175 | B2 | 2/2011 | Kryze et al. |
| 8,065,624 | B2 | 11/2011 | Morin et al. |
| 8,527,896 | B2 | 9/2013 | Matthews et al. |
| 8,527,900 | B2 | 9/2013 | Mueller et al. |
| 8,606,519 | B2 | 12/2013 | Waeller |
| 8,614,664 | B2 | 12/2013 | Yasutake |
| 8,711,115 | B2 | 4/2014 | Ozawa et al. |
| 8,854,433 | B1 | 10/2014 | Rafii |
| 8,937,590 | B2 | 1/2015 | Hachiya et al. |
| 9,009,612 | B2 | 4/2015 | Fleizach et al. |
| 9,039,513 | B2 | 5/2015 | Schultz et al. |
| 9,041,653 | B2 | 5/2015 | Chen et al. |
| 9,152,373 | B2 | 10/2015 | King |
| 9,201,587 | B2 | 12/2015 | Lin et al. |
| 9,213,482 | B2 * | 12/2015 | Mai ..................... G06F 3/04883 |
| 9,223,493 | B2 | 12/2015 | Cho |
| 9,268,478 | B2 | 2/2016 | Nutaro et al. |
| 9,298,363 | B2 | 3/2016 | Crumly |
| 9,367,216 | B2 | 6/2016 | Zalewski et al. |
| 9,377,949 | B2 | 6/2016 | Zuo et al. |
| 2006/0071915 | A1 | 4/2006 | Rehnm |
| 2006/0119588 | A1 | 6/2006 | Yoon et al. |
| 2008/0074384 | A1 | 3/2008 | Orr et al. |
| 2008/0238880 | A1 | 10/2008 | Miwa |
| 2009/0262086 | A1 | 10/2009 | Chen |
| 2010/0225599 | A1 * | 9/2010 | Danielsson ........... G06F 3/0237 345/173 |
| 2010/0308983 | A1 * | 12/2010 | Conte ..................... G06F 3/016 340/407.2 |
| 2010/0315266 | A1 | 12/2010 | Gunawardana et al. |
| 2011/0022990 | A1 | 1/2011 | Wu et al. |
| 2011/0134030 | A1 | 6/2011 | Cho |
| 2011/0141012 | A1 | 6/2011 | Noh et al. |
| 2011/0191723 | A1 | 8/2011 | Wu et al. |
| 2011/0205169 | A1 * | 8/2011 | Yasutake ............. G06F 3/03547 345/173 |
| 2012/0007823 | A1 * | 1/2012 | Ozawa ................. G06F 3/0236 345/173 |
| 2012/0173890 | A1 | 7/2012 | Root et al. |
| 2013/0033424 | A1 | 2/2013 | Sugawara |
| 2013/0050122 | A1 | 2/2013 | Kang et al. |
| 2013/0100158 | A1 | 4/2013 | Hongi et al. |
| 2013/0159902 | A1 | 6/2013 | Kwak et al. |
| 2013/0181952 | A1 | 7/2013 | Lin et al. |
| 2014/0007015 | A1 | 1/2014 | Ekstrand et al. |
| 2014/0015755 | A1 * | 1/2014 | Hao ..................... G06F 3/0416 345/168 |
| 2014/0043535 | A1 | 2/2014 | Motoyama et al. |
| 2014/0111439 | A1 * | 4/2014 | Joe ..................... G06F 3/04886 345/168 |
| 2014/0191996 | A1 | 7/2014 | Hwang et al. |
| 2014/0210795 | A1 | 7/2014 | Mattes et al. |
| 2014/0245229 | A1 | 8/2014 | Jeon et al. |
| 2014/0267121 | A1 | 9/2014 | Luo |
| 2015/0062004 | A1 | 3/2015 | Ragii |
| 2015/0128083 | A1 * | 5/2015 | Jia ..................... G06F 16/3346 715/773 |
| 2015/0227250 | A1 | 8/2015 | Chen et al. |
| 2015/0339025 | A1 | 11/2015 | Yamamoto |
| 2015/0378545 | A1 | 12/2015 | Telang et al. |
| 2016/0011712 | A1 | 1/2016 | Yamamoto et al. |
| 2016/0062543 | A1 | 3/2016 | Mai et al. |
| 2016/0070433 | A1 | 3/2016 | Fleizach et al. |
| 2016/0077713 | A1 | 3/2016 | Luo et al. |
| 2016/0098099 | A1 | 4/2016 | Cho |
| 2016/0170577 | A1 | 6/2016 | Meganathan et al. |
| 2016/0259528 | A1 | 9/2016 | Foss et al. |

FOREIGN PATENT DOCUMENTS

| | | |
|---|---|---|
| CN | 101963858 | 2/2011 |
| CN | 101963859 | 2/2011 |
| CN | 102467261 | 5/2012 |
| CN | 102478996 | 5/2012 |
| CN | 105121227 | 12/2012 |
| CN | 102365611 | 12/2014 |
| CN | 102457295 | 12/2014 |
| CN | 101887323 | 3/2015 |
| CN | 104615262 | 5/2015 |
| CN | 104919403 | 9/2015 |
| CN | 102163096 | 11/2015 |
| CN | 103176691 | 11/2015 |
| CN | 101535933 | 12/2015 |
| CN | 103105963 | 3/2016 |
| CN | 102934049 | 6/2016 |
| CN | 103207757 | 7/2016 |
| WO | 2009076974 | 6/2009 |

OTHER PUBLICATIONS

Office Action of U.S. Appl. No. 14/547,211 dated Aug. 15, 2016, 18 pages.
Office Action of U.S. Appl. No. 14/547,211 dated Jan. 19, 2017, 22 pages.
Office Action of U.S. Appl. No. 15/680,680 dated Nov. 22, 2017, 34 pages.
Office Action of U.S. Appl. No. 15/633,809 dated Jan. 17, 2018, 25 pages.
Office Action of U.S. Appl. No. 15/680,680 dated Apr. 18, 2018, 31 pages.
Office Action of U.S. Appl. No. 15/680,680 dated Jul. 31, 2018, 17 pages.
Office Action of U.S. Appl. No. 15/680,680 dated Dec. 18, 2018, 23 pages.
Office Action of U.S. Appl. No. 15/680,680 dated Mar. 26, 2019, 18 pages.

* cited by examiner

SYSTEM AND METHOD FOR PROVIDING ABSOLUTE COORDINATE AND ZONE MAPPING BETWEEN A TOUCHPAD AND A DISPLAY SCREEN

CROSS-REFERENCE TO RELATED APPLICATIONS

This application is a continuation of and claims priority to pending U.S. patent application Ser. No. 15/633,809 entitled "SYSTEM AND METHOD FOR PROVIDING ABSOLUTE COORDINATE AND ZONE MAPPING BETWEEN A TOUCHPAD AND A DISPLAY SCREEN", which was filed on Jun. 27, 2017, which is a continuation of U.S. patent application Ser. No. 14/547,211, issued as U.S. Pat. No. 9,727,231 and entitled "SYSTEM AND METHOD FOR PROVIDING ABSOLUTE COORDINATE AND ZONE MAPPING BETWEEN A TOUCHPAD AND A DISPLAY SCREEN", which was filed on Nov. 19, 2014; the entirety of which is incorporated by reference herein.

BACKGROUND

Vehicles are often equipped with a display unit or units located at the vehicle dash board or other area of the vehicle that are utilized to provide various user interfaces to vehicle occupants. Many of the user interfaces have different formats and layouts that present users with various shapes, sizes, and locations of input icons through the display unit. In many instances, these display units are operably connected to a touchpad that is remotely located within the vehicle (e.g., in the center panel of the vehicle) in order to provide inputs to the input icons on the graphical user interfaces.

A key limitation of touchpads is that touchpads are relatively mapped to the display unit. For example, when the user touches the touchpad, the touchpad converts the input data into relative coordinate values causing a delayed access to user interface objects of the user interface being shown on a display screen. In other words, a touch input on a touchpad is not registered at the corresponding area of the display screen as it is being inputted on the touchpad by the user. In addition, conventionally only user interface objects are selected when a user drags a cursor to the position of the user interface object on the display. Therefore, no input is received on any of the user interface objects unless the user touch inputs the touchpad by dragging, swiping, and/or moving touch inputs to manipulate the location of the cursor to one of the user interface objects. This limitation can cause areas of the touchpad to not correspond to the user interface input objects without further effort from the user and can cause undue distraction, inefficiency, and frustration for the user, especially in the case of a driver of the vehicle.

BRIEF DESCRIPTION

According to one aspect, a method for providing absolute coordinate mapping using zone mapping input in a vehicle is provided. The method may include determining a touch input received on a touchpad located in the vehicle. The method may also include presenting an absolute mapped position of the touch input on a display screen located in the vehicle. The method may additionally include presenting one or more user interface objects on the display screen. Additionally, the method may include providing a plurality of display input zones corresponding to one or more user interface objects presented on the display screen. Further, the method may include determining a user input to one of the one or more user interface objects presented on the display screen based on the absolute mapped position of the touch input on at least one of the one or more user interface objects presented on the display screen, and the plurality of display input zones on the display screen.

According to another aspect, a system for providing absolute coordinate mapping using zone mapping input in a vehicle is provided. The system may include a coordinate touch recognition module that determines a touch input received on a touchpad located in the vehicle. The system may additionally include a coordinate display recognition module that presents an absolute mapped position of the touch input on a display screen located in the vehicle. The system also may include a user interface management module that presents one or more user interface objects on the display screen and provides a plurality of display input zones corresponding to one or more user interface objects presented on the display screen. The user interface management module determines a user input to one of the one or more user interface objects presented on the display screen based on the absolute mapped position of the touch input received on at least one of the one or more user interface objects presented on the display screen, and the plurality of display input zones on the display screen.

According to still another aspect, a computer readable medium is provided including instructions that when executed by a processor execute a method for providing absolute coordinate mapping using zone mapping input. The instructions may include determining a touch input received on a touchpad located in a vehicle. The instructions may also include presenting an absolute mapped position of the touch input on a display screen located in the vehicle. The instructions may additionally include presenting one or more user interface objects on the display screen. Additionally, the instructions may include providing a plurality of display input zones corresponding to one or more user interface objects presented on the display screen. Further, the instructions may include determining a user input to one of the one or more user interface objects presented on the display screen based on the absolute mapped position of the touch input on at least one of the one or more user interface objects presented on the display screen, and the plurality of display input zones on the display screen.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing Figures are not necessarily drawn to scale and certain Figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
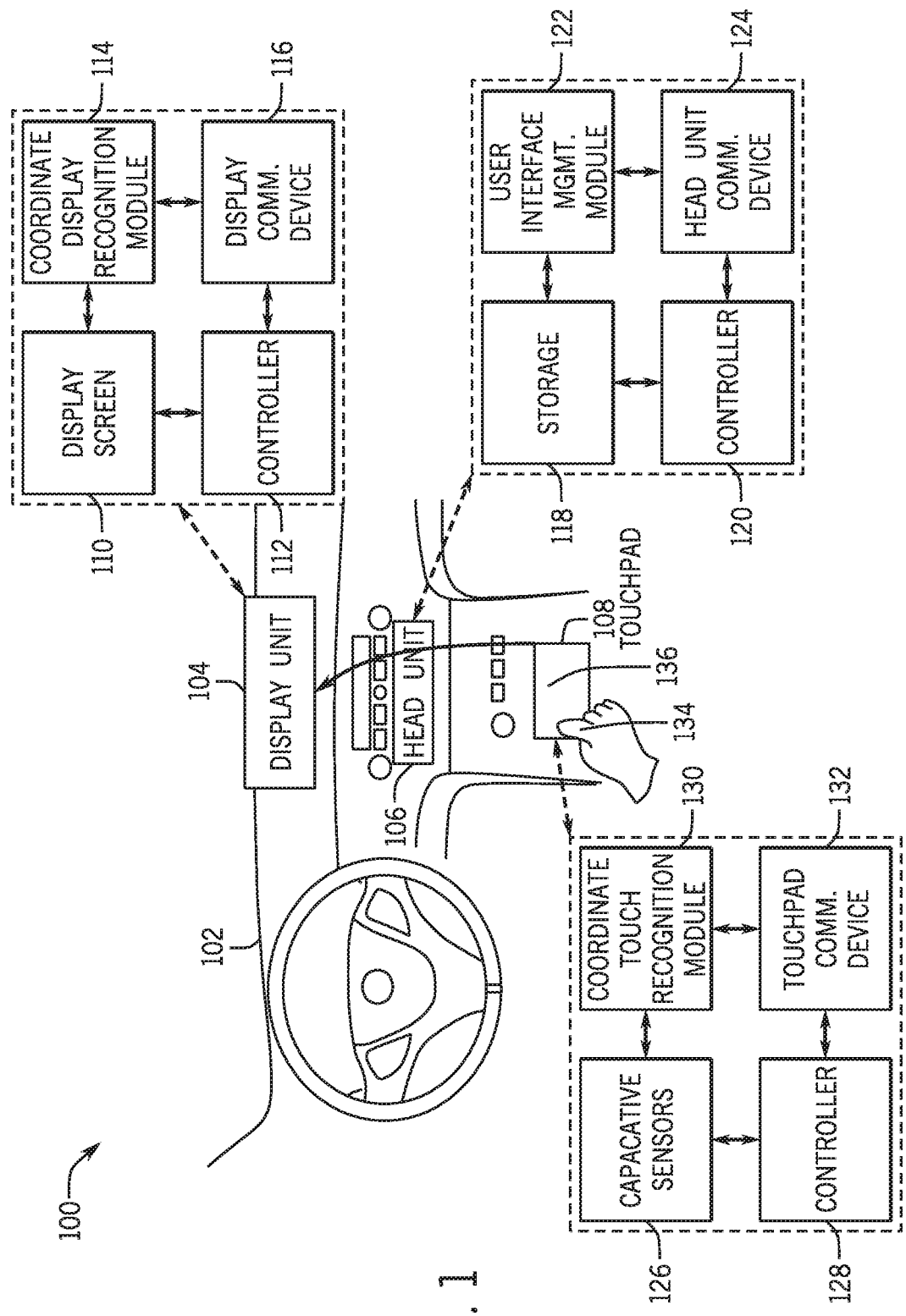
FIG. 1 is a schematic view of a system for providing absolute coordinate mapping using zone mapping input, according to an exemplary embodiment.

The following includes definitions of selected terms employed herein. The definitions include various examples and/or forms of components that fall within the scope of a term and that may be used for implementation. The examples are not intended to be limiting.

A "processor", as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus", as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

A "memory", as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

An "operable connection", as used herein may include a connection by which entities are "operably connected", is one in which signals, physical communications, and/or logical communications may be sent and/or received. An operable connection may include a physical interface, a data interface, and/or an electrical interface.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

An "input device" as used herein may include devices for controlling different vehicle features which are include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

An "output device" as used herein may include devices that may derive from vehicle components, systems, subsystems, and electronic devices. The term "output devices" includes, but is not limited to: display units, and other devices for outputting information and functions.

Referring now to the drawings, wherein the showings are for purposes of illustrating one or more exemplary embodiments and not for purposes of limiting the same, FIG. 1 is a schematic view of a system for providing absolute coordinate mapping using zone mapping input, according to an exemplary embodiment. The system, which can also be referred to as an absolute zone mapping system, is generally designated by reference numeral 100. As described in more detailed below, the absolute zone mapping system 100 may be utilized to provide users (e.g., one or more occupants of a vehicle 102) with the ability to provide touch inputs through a touchpad 108 to various user interfaces shown through a display unit 104. The absolute zone mapping system 100 utilizes absolute coordinate mapping that allows the user to touch a specific portion of the surface 136 of the touchpad 108 and provide an input to a corresponding portion of the user interface shown on a display screen 110 of the display unit 104 that is represented by an input indicator. In one embodiment, the input indicator may be a visible cursor, pointer, or marker that is placed at a location of the display screen 110 corresponding to the touch input location on the touchpad 108. In an alternate embodiment, the input indicator may not be visible but may still be utilized as a focal input point that is placed at a location of the display screen 110 corresponding to the touch input location on the touchpad 108. In addition, the absolute zone mapping system 100 provides zone mapping in order for the user to utilize absolute coordinate mapping to input user interface objects in a rapid manner without having to touch input a portion of the touchpad that is specially mapped to the location of a user interface object.

The components included within the system 100 may be interconnected via one or more system buses. It will be understood that FIG. 1 constitutes, in some respects, an abstraction and that the actual organization of the components of the system 100 may be more complex than illustrated. In one embodiment, the system 100 is centered around the vehicle 102 that includes the display unit 104 that may be located within the center of the dashboard of the vehicle 102, as shown in FIG. 1. In alternate embodiments, the display unit 104 may be located in other areas of the vehicle 102 such as within a steering wheel or behind a driver and/or passenger seat(s). The display unit 104 may be configured in a variety of form factors, shapes, sizes, designs, and/or configurations. As will be discussed in more detail below, the display unit 104 is operably connected to the touchpad 108. The touchpad 108 is utilized by the user(s) to provide touch inputs to one or more user interfaces corresponding to operating systems, applications, vehicle systems, vehicle subsystems, etc. that are executed and stored on a head unit 106 within the vehicle 102.

The exemplary embodiment of the display unit 104 shown in FIG. 1 includes the display screen 110, a controller 112, a coordinate display recognition module 114, and a display communication device 116. The display screen 110 may be a flat panel display that may include a liquid crystal display (LCD) device, an electroluminescent display (ELD) device, a field emission display (FED) device, a plasma display panel (PDP), a thin film transistor LCD (TFT-LCD) device, a flexible display unit, an organic light-emitting diode (OLED), an active-matrix organic light-emitting diode (AMOLED), etc. The display screen 110 may be configured in a variety of form factors, shapes, sizes, designs, and/or configurations. For example, the display screen 110 may be configured in a wide or ultra-wide format. In an alternate embodiment, the display unit 104 can include a heads up display that projects the display screen 110 upon the windshield of the vehicle 102.

The controller 112 controls the display unit 104 based in part on coordinate data that is received by the display communication device 116. The controller 112 may be any hardware device capable of executing instructions stored within a memory/storage (not shown). As such, the controller 112 may include a microprocessor, field programmable gate array (FPGA), application-specific integrated circuit (ASIC), or other similar devices. The controller 112 may interact with a display driver (not shown) that is utilized to provide images to the display screen 110 based on commands sent by the controller 112. In one embodiment, inherent processing memory (not shown) of the controller 112 may store operational instructions, applications, and/or interfaces that are specific to the display unit 104 and are executed by the controller 112. For example, the controller 112 may execute a display settings user interface to be utilized by the user to select settings shown on the display screen 110 such as color, tint, sharpness, format, etc.

The display communication device 116 may be capable of providing wired or wireless computer communications utilizing various protocols to send/receive non-transitory signals internally to the head unit 106 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the display communication device 116 can be operably connected for internal computer communications to the head unit 106 and/or touchpad 108 via a bus (e.g., a Controller Area Network (CAN) or a Local Interconnect Network (LIN) protocol bus). In an exemplary embodiment, the display communication device 116 may receive input signals and send output signals to both the head unit 106 and the touchpad 108. In one embodiment, the display communication device 116 may also communicate with external devices in order for the controller 112 to receive inputs to be shown on the display screen 110. For example, the display communication device 116 may communicate via wireless computer communication with the user's portable electronic device.

The display unit 104 also includes the coordinate display recognition module 114. In one embodiment, the coordinate display recognition module 114 is a separate hardware device that includes a separate processor, memory, storage, or other hardware. In an alternate embodiment, the coordinate display recognition module 114 may be included as part of the controller 112 (i.e., stored within the memory/storage of the controller) to be specifically utilized when executed. In an exemplary embodiment, the coordinate display recognition module 114 is utilized to determine the display coordinate values (display coordinates) of user interface objects that are presented (via the head unit 106) and displayed on the display screen 110. Display coordinates include locational coordinates that are determined based on the surface area of the display screen 110.

In an exemplary embodiment, the coordinate display recognition module 114 is utilized to determine the display coordinates of one or more user interface objects, and/or the input indicator, as described in more detail below. In one embodiment, the coordinate display recognition module 114 identifies the display coordinates as being x and y points that contain one or more pixels. The y point defines the vertical side(s) of the display screen 110, and the x point defines the horizontal side(s) of the display screen 110. In one embodiment, the coordinate display recognition module 114 determines the display coordinates from an origin point being on the left top corner of the display screen 110. For example, based on an exemplary scaling system the "0, 0" point is in the upper left corner of the display screen 110, and the "999, 999" point is at the lower right corner of the display screen 110. In the example, the display coordinates represent a square shaped display screen 110, however, the display screen 110 may be configured in any form factor, shape, and/or size (e.g., widescreen, ultra-widescreen). Therefore, the coordinate display recognition module 114 may utilize any type of scaling system that may depend on the size and shape of the display screen 110.

In one embodiment, the coordinate display recognition module 114 utilizes data sent from the head unit 106 (through the display communication device 116) with regards to user input objects in order to evaluate specific display coordinates that will be utilized on the display screen 110 to display the user interface objects. In one embodiment, the coordinate display recognition module 114 also sends data to the head unit 106 (through the display communication device 116) with regards to the display coordinates of the input indicator with respect to the user interface objects.

In an exemplary embodiment, the coordinate display recognition module 114 utilizes data sent from the touchpad 108 (through the display communication device 116) that include touchpad coordinates with respect to touch inputs received by the user(s) in order to provide absolute coordinate mapping between the touchpad 108 and the display screen 110. In an exemplary embodiment, the coordinate display recognition module 114 interprets one or more touchpad coordinates that are received from the touchpad 108. The touchpad coordinates include x, y coordinate values that correspond to the position of the user's touch input upon the surface of the touchpad 108.

As will be described in more detail below, based on the receipt and evaluation of the touchpad coordinates (received from the touchpad 108) by the coordinate display recognition module 114, the controller 112 controls the placement of the input indicator on the display panel 250 to be placed at an area of the display screen 110 that includes corresponding display coordinates. In one embodiment, the coordinate display recognition module 114 also sends data to the touchpad 108 (through the display communication device 116) based on the display coordinates of user interface objects shown on the display screen 110.

In the embodiment shown in FIG. 1, the head unit 106 may include a storage 118, a controller 120, a user interface management module 122, and a head unit communication device 124. The storage 118 of the head unit 106 may include various memories such as, for example, L1, L2, or L3 cache or system memory. As such, the memory may include static random access memory (SRAM), dynamic RAM (DRAM), flash memory, read only memory (ROM), or other similar memory devices. The storage 118 may be utilized to store one or more operating systems, applications, associated operating system data, application data, vehicle system and subsystem user interface data, and the like that are executed by the controller 120.

The controller 120 may be any hardware device capable of executing instructions stored within a memory/storage (not shown). As such, the controller 120 may include a microprocessor, field programmable gate array (FPGA), application-specific integrated circuit (ASIC), or other similar devices. In an exemplary embodiment, the controller 120 is utilized to execute one or more user interfaces associated with the operating systems, applications, vehicle systems, and subsystems. In one embodiment, the controller 120 may include an electronic control unit (not shown) of the vehicle 102 that is utilized to control any and all electronic components located within the vehicle 102. In yet an alternate embodiment, the controller 120 may control the display unit 104 and/or the touchpad 108 in lieu of separate respective controllers 112, 128 included therein.

The head unit communication device 124 may be capable of providing wired or wireless computer communications utilizing various protocols to send/receive non-transitory signals internally to the display unit 104 and/or the touchpad 108 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system. Additionally, the head unit communication device 124 may be operably connected for internal computer communications to the display unit 104 and/or touchpad 108 via a bus. In one embodiment, the head unit communication device 124 may also communicate with external devices in order for the controller 120 to execute computer program instructions located on an external device. For example, the head unit communication device 124 may communicate via wireless computer communication with the user's portable electronic device in order to execute an infotainment application that is stored on the portable electronic device through the vehicle infotainment system (not shown) to be displayed through the display unit 104.

In an exemplary embodiment, upon execution of one or more applications that are stored on the storage 118, the controller 120 may utilize the head unit communication device 124 to communicate via computer communication with the display communication device 116 in order to display one or more user interfaces and associated user interface objects on the display screen 110 of the display unit 104. In one embodiment, the head unit communication device 124 may also be utilized to communicate with the touchpad 108 in order to provide data that pertains to user interfaces that correspond to the one or more operating systems, applications, and/or vehicle systems and subsystems.

In an exemplary embodiment, the user interface management module 122 is utilized to provide data that pertains to user interfaces that correspond to the one or more operating systems, applications, and/or vehicle systems and subsystems executed by the controller 120. In one embodiment, the user interface management module 122 communicates with the coordinate display recognition module 114 (via the communication devices 116 and 124) to determine the display coordinates of the display screen 110. In addition, the user interface management module 122 may send data to the coordinate display recognition module 114 respective of user interface objects that are to be placed at respective display coordinates of the display screen 110.

As described below, in one embodiment, the user interface management module 122 receives data from the coordinate display recognition module 114 of the display unit 104 that indicates the display coordinates of the input indicator with respect to user interface objects displayed on the display screen 110. As will be described in more detail below, the user interface management module 122 determines absolute zone mapping between the touchpad 108 and the display unit 104 in order to provide inputs to one or more user interface objects based on display and touch input zones.

In one embodiment, the user interface management module 122 may also be utilized to provide data to the touchpad 108 in order to determine touchpad coordinates of the touchpad 108 that correspond to user interface objects being presented on the display screen 110. In an alternate embodiment, the user interface data provided by the user interface management module 122 may be utilized by the touchpad 108 to provide added functionality independent of any user interface object(s) displayed on the display screen 110. For example, the touchpad 108 may utilize a specific type of swiping, tapping, and/or sliding action of the user's finger on the touchpad 108 to activate functions of the audio system of the vehicle 102.

In the embodiment shown in FIG. 1, the touchpad 108 may be in a form of a rectangular surface that includes the surface 136 that may translate the motion and position of one or more of the user's finger(s) 134 to an absolute position on the display screen 110 of the display unit 104. The surface 136 of the touchpad 108 may be configured in a variety of form factors, shapes, sizes, designs, and/or configurations. For example, the surface 136 may be configured in a wide or ultra-wide format. In one embodiment, the touchpad 108 may provide tactile feedback and/or pressure sensing. For example, the touchpad 108 may receive an input by increasing the pressure of the user's finger 134 on the surface 136 of the touchpad 108, instead of providing a separate touch input in the form of lifting and tapping the user's finger 134. In an alternate embodiment, the touchpad 108 may also include a "hot spot" location of the touchpad surface 136 that provides specific types of functionality apart from the remaining portion of the touchpad surface 136. For example, a "hot spot" location of the touchpad surface 136 may include scrolling zones (horizontal and/or vertical scroll bars that are visibly shown on the surface 136 of the touchpad 108) that act as a scroll wheel specifically provided to quickly scroll through user interfaces shown on the display screen 110.

As described above, the absolute zone mapping system 100 utilizes absolute coordinate mapping that allows the user to touch a specific portion of the surface 136 of the touchpad 108 and simultaneously access a corresponding portion of the user interface, as represented by the input indicator, shown through the display unit 110. Therefore, the touchpad coordinates on the surface 136 of the touchpad 108 may be absolute mapped to the display point coordinate values on the display screen 110 of the display unit 104. In other words, upon receiving a touch input on the touchpad 108 from the user(s), the absolute position where the user's finger touch inputs the surface 136 at specific touchpad coordinates is mapped by placing the input indicator at corresponding display coordinates on the display screen 110. Specifically, the absolute position at upper left corner of the touchpad surface coordinates may be mapped to the absolute location at upper left corner of the display screen coordinates. Similarly, the absolute position at lower left corner, lower right corner, and upper right corner of the touchpad surface coordinates are mapped to their respective corners on the display screen coordinates.

In an alternate embodiment, the touchpad 108 may include an input switch that provides the user the capability to switch between the absolute coordinate positioning mode and a relative coordinate positioning mode. For example, if the user would like to operate the touchpad 108 to provide the input indicator that is relatively positioned to the display unit 104 (in a manner similar to a computer mouse pointer), the touchpad 108 may be switched from the absolute coordinate mapping mode to the relative coordinate mapping mode. When the touchpad 108 is in the relative coordinate mapping mode, the touchpad coordinates of the touchpad 108 do not absolutely correspond to the display coordinates of the display screen 110. Therefore, in the relative coordinate mapping mode, the input indicator is independently positioned on the display screen 110 relative to the user's touch input received at specific touchpad coordinates on the surface 136 of the touchpad 108.

As shown in FIG. 1, in an exemplary embodiment, the touchpad 108 may include capacitive sensors 126, a controller 128, the coordinate touch recognition module 130, and touchpad communication device 132. The capacitive sensors 126 may be capable of determining capacitance to determine the user touch input from the user's finger(s) 134 on the surface 136 of the touchpad 108. In an exemplary embodiment, the capacitive sensors 126 send a signal corresponding to multiple points of touch input received on the surface 136 of the touchpad 108. The capacitive sensors 126 may be able to sense multi-touch gestures as well as various types of gesturing techniques such as tapping gestures, swiping gestures, swirling gestures, scrolling gestures, etc. In one embodiment, the capacitive sensors 126 can be located at numerous touchpad coordinate locations of the touchpad 108 and are able to sense touch inputs from every touch point provided at every touchpad coordinate location.

In an alternate embodiment, the touchpad 108 may be a resistive touchpad that may not include the capacitive sensors 126. The resistive touchpad 108 may instead include layered sheets that respond to pressure on the surface 136 of the touchpad 108 by contacting one another at specific touchpad coordinate locations based on the touch input of the user's finger(s) 134, a stylus, or other device on the surface 136 of the touchpad 108. In yet an another embodiment, the touchpad 108 may be a conductance touchpad that includes two surfaces with sensors that connect to each other upon receiving the user's touch input at specific touchpad coordinate locations.

In an exemplary embodiment, the controller 128 controls the touchpad 108 based in part on touch inputs received at touchpad coordinate location(s) that are sensed by the capacitive sensors 126. The controller 128 may be any hardware device capable of executing instructions stored within a memory/storage (not shown). As such, the controller 128 may include a microprocessor, field programmable gate array (FPGA), application-specific integrated circuit (ASIC), or other similar devices. The controller 128 may interact with a touchpad driver (not shown) that may interpret the user's touch inputs on the surface 136 of the touchpad 108.

In one embodiment, the controller 128 evaluates touch inputs received on the surface 136 of the touchpad 108. Specifically, upon sensing of the touch input(s) from the user's finger 134 touching the surface 136 of the touchpad 108, the capacitive sensors 126 send one or more touch input signals to the controller 128 indicating the presence of the touch input(s) on the touchpad 108. In an exemplary embodiment, the controller 128 of the touchpad 108 can utilize instructions stored within inherent processing memory (not shown) of the controller 128 to provide commands to control and operate components of the touchpad 108 such as the coordinate touch recognition module 130.

In one embodiment, the coordinate touch recognition module 130 is a separate hardware device that includes a separate processor, memory, storage, or other hardware. In an alternate embodiment, the coordinate touch recognition module 130 may be included as part of the controller 128 (i.e., stored within the inherent processing memory of the controller 128) to be specifically utilized when executed. In an exemplary embodiment, the coordinate touch recognition module 130 is utilized to determine the touchpad coordinates of touch inputs that are registered by the controller 128. Specifically, upon the capacitive sensors 126 sensing the user's finger(s) 134 touching the surface 136 of the touchpad 108, the controller 128 registers the touch input and provides the touch input as raw data to the coordinate touch recognition module 130. The controller 128 utilizes the coordinate touch recognition module 130 to determine the touchpad coordinates of the touch input on the surface 136 of the touchpad 108.

In one embodiment, the coordinate touch recognition module 130 identifies the touchpad coordinates as being x and y points (corresponding to a horizontal and vertical axis) that contain one or more capacitive sensors 126. The y point defines the vertical side(s) of the touchpad 108, and the x point defines the horizontal side(s) of the touchpad 108. In one embodiment, the coordinate touch recognition module 130 determines the touchpad coordinates from an origin point being on the left top corner of the surface 136 of the touchpad 108. For example, based on an exemplary scaling system, the "0, 0" point is in the upper left corner of the touchpad 108, and the "399, 399" point is at the lower right corner of the touchpad 108. In this example, the touchpad coordinates represent a square shaped touchpad 108, however, the touchpad 108 may be configured in any form factor, shape, and/or size (e.g., wide, ultra-wide). Therefore, the coordinate touch recognition module 130 may utilize any type of scaling system that may depend on the size and shape of the touchpad 108.

The touchpad communication device 132 may be capable of providing wired or wireless computer communications utilizing various protocols to send/receive non-transitory signals internally to the head unit 106 and/or the display unit 104 and externally to external devices. Generally, these protocols include a wireless system (e.g., IEEE 802.11, IEEE 802.15.1 (Bluetooth)), a near field communication system (NFC) (e.g., ISO 13157), a local area network (LAN), and/or a point-to-point system.

The touchpad communication device 132 can be operably connected for internal computer communications to the head unit 106 and/or display unit 104 via a bus. In one embodiment, the touchpad communication device 132 may receive input signals and send output signals to both the head unit 106 and the display unit 104. In one embodiment, the touchpad communication device 132 may also communicate with external devices in order for the controller 128 to send inputs to various vehicle systems and subsystems. For example, the touchpad communication device 132 may communicate directly with the vehicle audio system to provide input commands that are utilized for providing specific types of audio system functionality.

In an exemplary embodiment, the coordinate touch recognition module 130 provides the touchpad coordinates to be utilized by the coordinate display recognition module 114 to position the input indicator at an absolute mapped position at corresponding display coordinates of the display screen 110. In an exemplary embodiment, the touchpad communication device 132 may communicate directly with the display communication device 116 in order for the coordinate touch recognition module 130 to provide the touchpad coordinate values to the coordinate display recognition module 114. In an alternate embodiment, the touchpad communication device 132 and the display communication device 116 may communicate directly in order for the coordinate display recognition module 114 to send display coordinates corresponding to one or more user interface objects that are presented on the display screen 110, to the coordinate touch recognition module 130.

Figure 2:
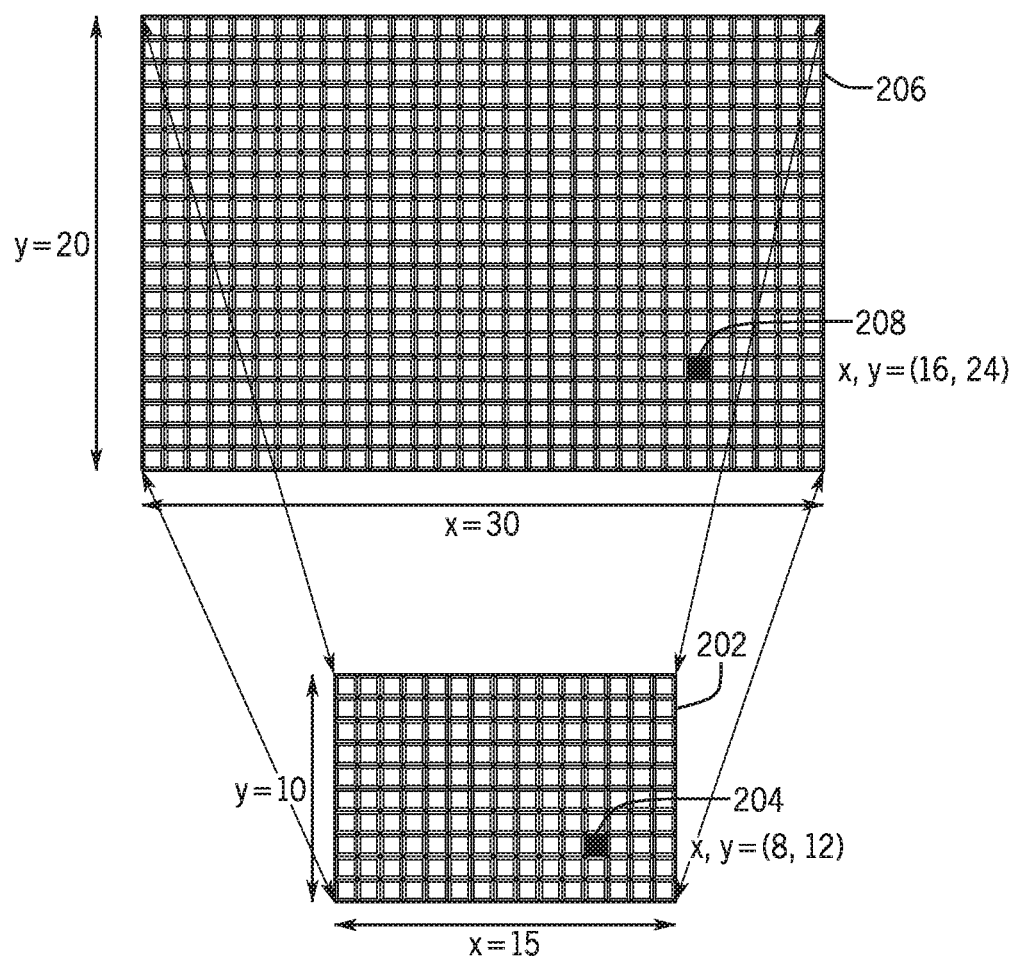
FIG. 2 is a view illustrating absolute coordinate mapping between a touchpad and a display screen, according to an exemplary embodiment.

FIG. 2 is a view illustrating absolute coordinate mapping between the touchpad 202 and the display screen 206, according to an exemplary embodiment. FIG. 2 illustrates the display screen 206 and a touchpad 202 utilizing a simplified coordinate scale for the purposes of providing a simplistic example of absolute coordinate mapping. As shown, the absolute position at the upper left and right corners of the surface 136 includes touchpad coordinates that are mapped to the absolute location at upper left and right corners of display screen 206 that include corresponding display coordinates. Similarly, the absolute position at lower left corner and right corners of the surface 136 includes touchpad coordinates that are mapped to the absolute location at their respective lower left and right corners of the display screen 206 that include corresponding display coordinates. Thus, each area of the surface 136 of the touchpad 202 has a corresponding absolute point on the display screen 206.

As stated above, the coordinate display recognition module 114 can utilize any type of scaling system that may depend on the size and dimensions of the display screen 204. Additionally, the coordinate touch recognition module 130 may also utilize any type of scaling system that may depend on the size and dimensions of the touchpad 202. The display screen 204 may be scaled by measuring the display screen dimensions and/or the number of horizontal (x) axis and vertical (y) axis display coordinates on the display screen 206 as determined by the coordinate display recognition module 114. In addition, the touchpad 202 may also be similarly scaled by measuring the touchpad dimensions and/or the number of horizontal (x) axis and vertical (y) axis touchpad coordinates on the touchpad 202 as determined by the coordinate touch recognition module 130.

In one embodiment, upon receiving the touch input from the user on the surface 136 of the touchpad 202, the coordinate touch recognition module 130 determines the x and y touchpad coordinates of the user's touch input 204. In the illustrative example shown in FIG. 2, the capacitive sensors 126 sense the user's touch input 204 and provide touch sensing signal(s) to the coordinate touch recognition module 130. In one embodiment, the coordinate touch recognition module 130 determines the x and y touchpad coordinates based on the location where the touch input is sensed on the surface 136 of the touchpad 202. As shown in the illustrative example, the coordinate touch recognition module 130 determines the touchpad input occurring at the x, y touchpad coordinates (8, 12) of the surface 136 of the touchpad 202.

In an exemplary embodiment, upon determining the touchpad coordinates, the coordinate touch recognition module 130 utilizes the touchpad communication device 132 to send the touchpad coordinate values to the display communication device 116 to be evaluated by the coordinate display recognition module 114. The coordinate display recognition module 114 evaluates the touchpad coordinates received from the coordinate touch recognition module 130 in order to present the input indicator 208 at absolute mapped position at display coordinates corresponding to the touchpad coordinates of the user's touch input 204.

In one embodiment, upon receiving the touchpad coordinate values via the display communicate device 116, the coordinate display recognition module 114 utilizes an (x:y) coordinate display ratio between the touchpad 202 and the display screen 206 to determine corresponding (x, y) display coordinate values. Specifically, upon receiving the touchpad coordinates from the coordinate touch recognition module 130, the coordinate display recognition module 114 evaluates the touchpad coordinates and calculates proportionate display coordinate values based on the ratio between the display screen (x:y) scale and the touchpad (x:y) scale. In one embodiment, the (x:y) display ratio can include the ratio between the length of the horizontal axis of the touchpad 202 and the length of the horizontal axis of the display screen 206, and a ratio between the length of the vertical axis of the touchpad 202 and the length of the vertical axis of the display screen 206.

As shown in the illustrative example of FIG. 2, there is a 1:2 display ratio between the touchpad 202 and the display screen 206 that includes 1:2 ratio on the x axis and a 1:2 ratio on they axis. The coordinate display recognition module 114 determines that the absolute display coordinate position on the display screen 206 at display coordinate values (16, 24) based on the touch input 204 received on the touchpad 202 at touchpad coordinate values (8, 12). Therefore, the coordinate display recognition module 114 places the input indicator 208 at the location of the display screen 110 corresponding to the display coordinate values (16, 24) in order to absolutely map the touch input received on the touchpad 204 to the input indicator 208 presented on the display screen 206. As described below, the input indicator 208 may input a user interface object that is located at the display coordinates (16, 24) shown on the display screen 206.

In an alternate embodiment, the coordinate touch recognition module 130 may utilize the touchpad communication device 132 to send the touchpad coordinate values to the head unit communication device 124 to be evaluated by the user interface management module 122. Upon receiving the touchpad coordinate values, the user interface management module 122 may register the touchpad coordinate values and may send data respective of user interface objects (that are to be placed at respective display coordinates of the display screen 110) along with the display coordinates values corresponding to the touchpad coordinate values to the coordinate display recognition module 114. In other words, the user interface management module 122 evaluates the touchpad coordinate values received from the coordinate touch recognition module 130 and translates them into display coordinate values that are sent to the coordinate display recognition module 114 to be utilized to provide the input indicator 208 and one or more user interface objects.

As described above, FIG. 2 shows the coordinate display recognition module 114 providing the input indicator 208 at the absolute mapped display coordinate values (16, 24) of the display screen 206 that corresponds to the absolute location of the touch input 204 received at touchpad coordinate values (8, 12) on the touchpad 202. Although in the example of FIG. 2, the touchpad coordinate values and the display point coordinate values are mapped as whole numbers, the coordinates may be specified to more defined/ precise coordinate values that may provide coordinate values in two or more digit decimal place values. For example, the touch input may have been inputted between x coordinate values 8 and 9, and y coordinate values 7 and 8 providing an touchpad coordinate values of (8.57, 7.56).

Figure 3A:
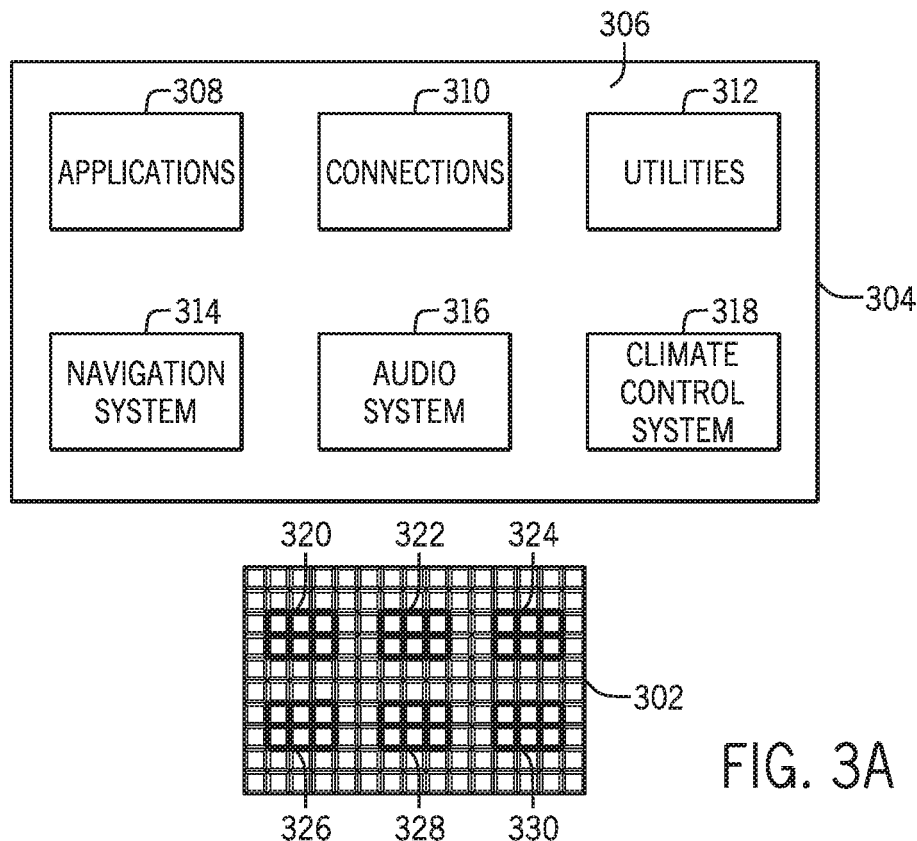
FIG. 3A is a view illustrating absolute coordinate mapping between a touchpad and a display screen, according to an exemplary embodiment.

FIG. 3A is a view illustrating absolute coordinate mapping between the touchpad 108 and the display screen 110, according to an exemplary embodiment. FIG. 3A illustrates the display screen 304 and the touchpad 302 utilizing a simplified coordinate scale for the purposes of providing a simplistic example of absolute coordinate mapping between the touchpad 302 and the display screen 304. In the illustrative example shown, touchpad 302 is operating in an absolute coordinate mapping mode, as described above. As shown, the display screen 304 displays the user interface 306 that is presented from the head unit 106 of the vehicle 102. Specifically, in the illustrative example shown, the user interface 306 is presented as a vehicle system/function interface menu that may be utilized by the user(s) within the vehicle 102 to navigate to one or more vehicle systems and/or functions.

Also as shown, the user interface 306 presented on the display screen 304 includes user interface objects 308-318 that may be utilized to execute vehicle systems and/or vehicle functions. Specifically, the user interface management module 122 sends user interface data to the coordinate display recognition module 114 (via the communication devices 116, 124). In an exemplary embodiment, the user interface data includes display data corresponding to user interface objects to be presented on the display screen 110. The coordinate display recognition module 114 evaluates the user interface data and determines the display coordinates associated with the user interface objects. For example, as shown, the coordinate display recognition module 114 determines the display coordinates corresponding to the location of the user interface 306 and the user interface objects 308-318 on the display screen 304. In an alternate embodiment, the user interface data sent by the user interface management module 122 also includes display coordinates associated with the user interface objects. For example, the user interface data sent from the user interface management module 122 includes the display coordinates of the user interface 306 including the user interface objects 308-318.

With continued reference to FIG. 3A, when absolute coordinate mapping is utilized between the touchpad 302 and the display screen 304, touchpad coordinates that correspond to the display coordinate areas on the display screen 304 where the user interface icons 308-318 are presented are utilized as active touchpad coordinate areas 320-330. In other words, the touchpad 302 can be utilized to directly input the user interface objects 308-318 when the user touches the portion of the surface 136 of the touchpad 302 at the active touchpad coordinate areas 320-330. For example, if the user's finger 134 touches the surface 136 of the touchpad 302 at the active touchpad coordinate area 326, the touch input will be registered at the corresponding display coordinate areas of the display screen 304 presenting user interface object 314 in order to execute the navigation system of the vehicle 102.

In an exemplary embodiment, once the coordinate display recognition module 114 determines that the input indicator is presented within one of the user interface objects 308-318 (based on the user's touch input on one of the active touchpad coordinate areas 320-330), the coordinate display recognition module 114 sends the absolute mapped display coordinates of the input indicator as a user input to the user interface management module 122. The user interface management module 122 registers the user input and the controller 120 executes a command based on the user input. In an alternate embodiment, once the coordinate touch recognition module 130 determines that the touch input occurs on one of the active touchpad coordinate areas 320-330, the coordinate touch recognition module 130 sends the absolute mapped touchpad coordinate values as a user input to the user interface management module 122.

Figure 3B:
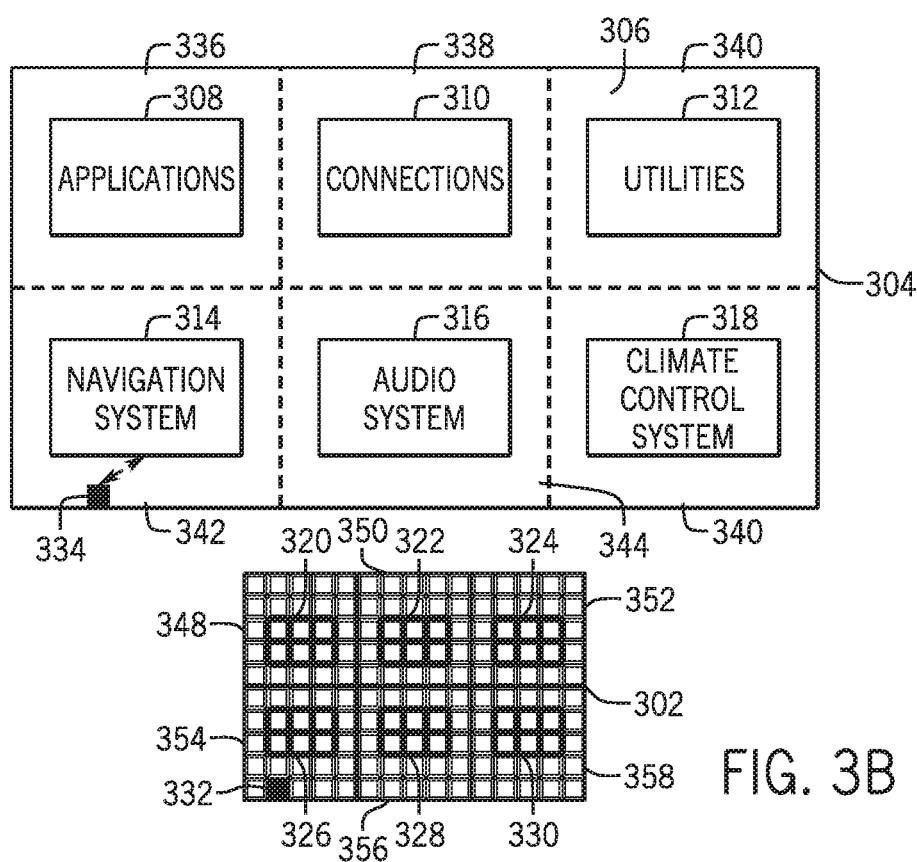
FIG. 3B is a view illustrating absolute coordinate mapping using zone mapping input between a touchpad and a display screen, according to an exemplary embodiment.

FIG. 3B is a view illustrating absolute coordinate mapping using zone mapping input between the touchpad 108 and the display screen 110, according to an exemplary embodiment. FIG. 3B illustrates the display screen 304 and the touchpad 302 utilizing a simplified coordinate scale for the purposes of providing a simplistic example of absolute coordinate mapping with zone mapping input between the touchpad 302 and the display screen 304. In an exemplary embodiment, the user may be able to switch the system 100 (e.g., via a user interface input switch) between the absolute coordinate mapping mode (described above with reference to FIGS. 2 and 3A) and an absolute zone mapping mode (described in reference to FIG. 3B). In one embodiment, the absolute zone mapping mode allows the user to quickly and efficiently provide one or more touch inputs to user interface objects by touching any portion of the touchpad 302. In other words, absolute zone mapping allows the user to provide inputs to one or more selectable user input objects displayed on the display screen 304, even if the touch input does not occur at active touchpad coordinates 320-330 of the touchpad 302. For example, the user may be able to provide inputs to user interface objects 308-318 displayed on the display screen 304 without having to specifically touch the touchpad 302 at active touchpad coordinate areas 320-330 (as was described above with reference absolute coordinate mapping in FIG. 3A).

As illustrated in the example shown in FIG. 3B, the user may provide a touch input 332 on the surface 136 of the touchpad 302 that is outside of the active touchpad coordinate areas 320-330. In the absolute coordinate mapping mode, the touch input 332 is presented as the input indicator 334 that is presented at an absolute coordinate position of the touch input 332 on the display screen 304. Also in the absolute coordinate mapping mode, since the touch input 332 was not received on any one of the active touchpad coordinate areas 320-330 corresponding to the user interface objects 308-318, an input is not received on any one of the user interface objects 308-318. In other words, the input indicator 334 corresponding to the touch input 332 is presented at a portion of the display screen 110 that does not contain any user interface objects, such as the user interface icons 308-318. Therefore, the touch input 330 will have no effect on the user interface 306 displayed on the display screen 304.

However, in an exemplary embodiment, when the system 100 is in the absolute zone mapping mode, the touch input received in areas of the surface 136 of the touchpad 108 that are not determined to be active touchpad coordinates of the touchpad 108 (that are not mapped via absolute coordinate mapping to user interface input objects 308-318) may also be utilized to provide inputs to the user interface objects displayed on the display screen 304 (in addition to the active touchpad coordinate areas 320-330). For example, as depicted in FIG. 3B, absolute zone mapping allows the user to efficiently provide the touch input 332 to the user interface object 314 without the user having to specifically touch input the active touchpad coordinate area 326 corresponding to the user interface object 314. Therefore, the touch input 332 at touch input zone 354 that corresponds to the placement of input indicator 334 within display input zone 342 is utilized to provide a user input to the user interface object 314. As shown, display input zones 336-346 may be provided that are associated to each of the user interface objects 308-318 and that correspond to touch input zones 348-358 via absolute coordinate mapping. The touch input zones 348-358 may be utilized to provide inputs to the user interface objects 308-318 without the user having to specifically input the active touch input coordinates 320-330.

In an exemplary embodiment, the size and placement of the display input zones 336-346 are determined by the user interface management module 122 upon receiving data from the coordinate display recognition module 114 that indicate the display coordinates of the input indicator 334 with respect to the user interface objects 308-318 displayed on the display screen 304. In an alternate embodiment, the size and placement of touch input zones 348-358 are determined by the user interface management module 122 upon receiving data from the coordinate touch recognition module 130 that indicates the active touchpad coordinates 320-330 of the touchpad 302 with respect to the user interface objects 308-318 displayed on the display screen 304.

In one embodiment, the user interface management module 122 determines the size and placement of the display input zones 336-346 by calculating display coordinates that are located within a determined measured distance from the display coordinates that include the edges of the user interface objects 308-318 displayed on the display screen 304. For example, the user interface management module 122 may determine the size and placement of the display input zones 336-346 by measuring the shortest distance from the display coordinates that include the edges of any of the user interface objects 308-318 to the remaining display coordinates of the display screen 304.

In an alternate embodiment, the user interface management module 122 determines the size and placement of the display input zones 336-346 by calculating display coordinates that are located within a determined measured distance from the display coordinates that include the center point of the user interface objects 308-318 displayed on the display screen 304. For example, the user interface management module 122 may determine the size and placement of the display input zones 336-346 by measuring the shortest distance from the display coordinates that include the center point of any of the user interface objects 308-318 to the remaining display coordinates of the display screen 304.

Upon determining the display input zones 336-346, the user interface management module 122 evaluates the display coordinates of the input indicator 334 (provided by the coordinate display recognition module 114) to determine which of the user interface objects 308-318 are to be selected/inputted based off of the touch input received at one of the corresponding touch input zones 348-358. For example, as shown, the input indicator 334 corresponding to the touch input 332 is determined to be presented within display input zone 342, and is utilized to provide the user input to user interface object 314.

Figure 4A:
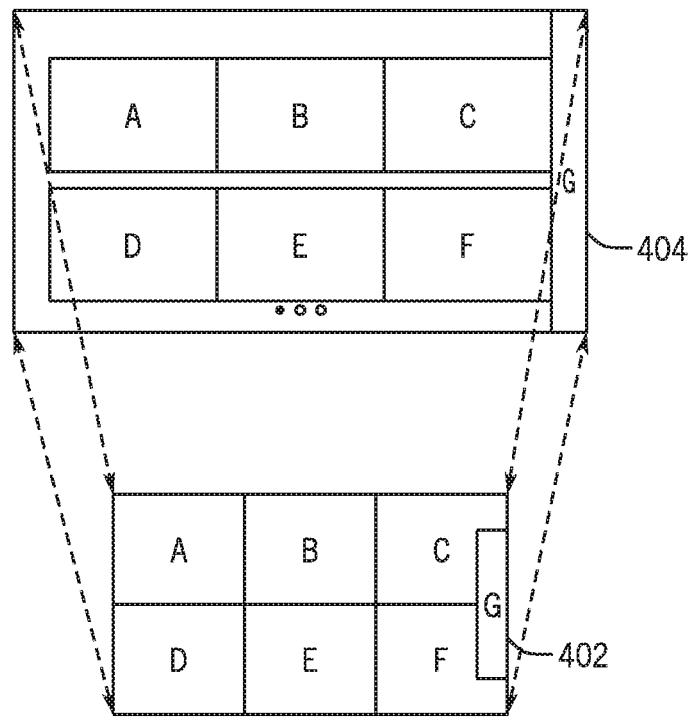
FIG. 4A is a view illustrating absolute coordinate mapping using zone mapping with detailed zones between a touchpad and a display screen, according to an exemplary embodiment.
Figure 4B:
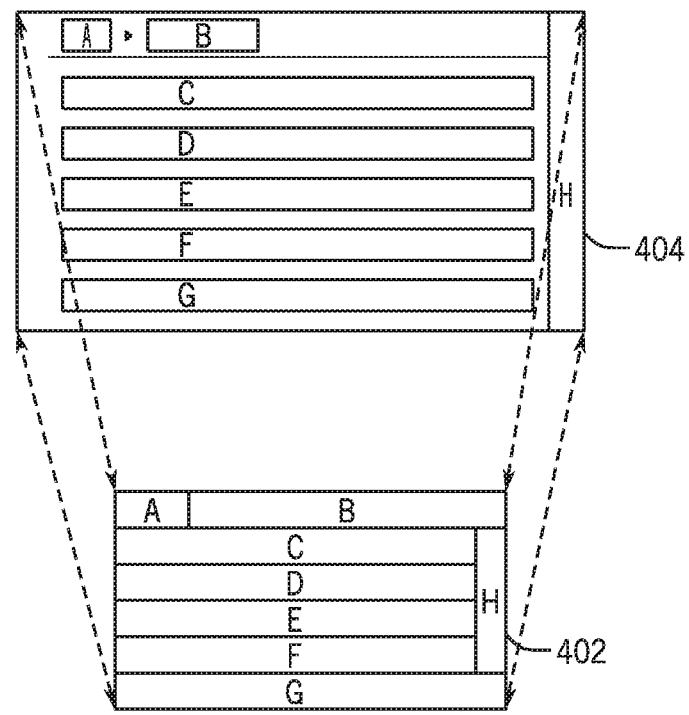
FIG. 4B is a view illustrating absolute coordinate mapping using zone mapping with detailed zones between a touchpad and a display screen, according to an exemplary embodiment.

FIGS. 4A and 4B are views illustrating absolute coordinate mapping using zone mapping with detailed zones between the touchpad 108 and the display screen 110, according to an exemplary embodiment. The user interface management module 122 may provide various types of user interfaces with user interface objects of different sizes and shapes that are placed at different areas (display coordinates) of the display screen 404. As shown, the user interface management module 122 may determine various detailed display and touch input zone formats that may be utilized to provide inputs from various touch input zones on the touchpad 402 that correspond with the user interface objects displayed on the display screen 404. This functionality is utilized to provide the touchpad 402 that is mapped via absolute coordinate mapping in a customizable manner to various types of user interfaces displayed on the display screen 404.

The user interface management module 122 may determine display and touch input zones based on the placement of the user interface objects on the display screen 404 at specific display coordinates. In an exemplary embodiment, the user interface management module 122 may determine customized display and touch input zones that are determined to have the highest utilization likelihood (most likely to be utilized) by the user based on the size, shape, and placement of one or more user interface objects displayed on the display screen 404. In some embodiments, the user interface management module 122 may provide detailed display and touch input zones based on the measurement of the display coordinates from the display coordinates including the edges or center of the user interface objects, as described above.

Figure 5:
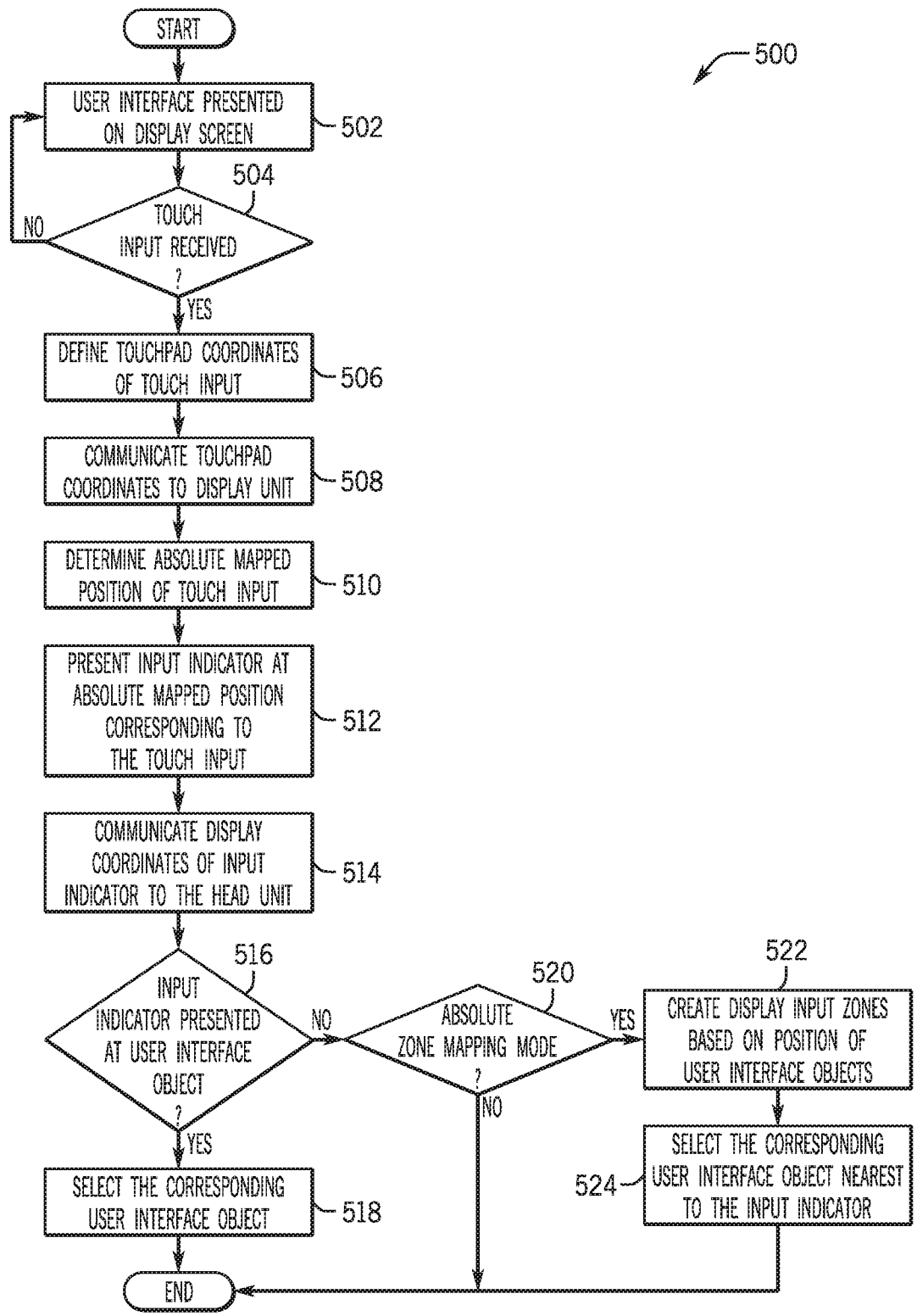
FIG. 5 illustrates an exemplary method for absolute coordinate mapping using zone mapping from the operating environment of FIG. 1, according to an exemplary embodiment.

FIG. 5 illustrates an exemplary method 500 for absolute coordinate mapping using zone mapping from the operating environment of FIG. 1, according to an exemplary embodiment. At step 502, the user interface is presented on display screen 110 of the display unit 104. In an exemplary embodiment, the user interface management module 122 communicates with the coordinate display recognition module 114 (via the communication devices 116, 124) to provide the user interface and corresponding user interface objects to the coordinate display recognition module 114 to be displayed at specific display coordinates of the display screen 110. At step 504, it is determined if a touch input is received on the touchpad 108. Specifically, it is determined if the user has touched the surface 136 of the touchpad 108 with a finger 134 or other object in order to provide a touch input on the touchpad 108 that is sensed by the capacitive sensors 126.

At step 506, if it is determined that the touch input was received on the touchpad 108 (at step 504), the coordinate touch recognition module 130 defines the touchpad coordinates corresponding to the touch input received on the touchpad 108. In an exemplary embodiment, the coordinate touch recognition module 130 determines the horizontal and vertical axis (x, y) coordinates of the area of the surface 136 that was touched by the user to provide the touch input. At step 508, the touchpad 108 communicates the touchpad coordinates to the display unit 104. As discussed above, in an exemplary embodiment, the coordinate touch recognition module 130 utilizes the touchpad communication device 132 to communicate directly with the display communication device 116 to provide the touchpad coordinates (defined at step 506) to the coordinate display recognition module 114.

At step 510, the display unit 104 determines the absolute mapped position of the touch input on the display screen 110. In an exemplary embodiment, upon receiving the touchpad coordinates from the coordinate touch recognition module 130, the coordinate display recognition module 114 utilizes the (x:y) coordinate display ratio between the touchpad 202 and the display screen 206 to determine corresponding (x, y) display coordinate values. At step 512, the coordinate display recognition module 114 presents the input indicator at the absolute mapped position on the display screen 110 corresponding to the touch input received on the touchpad 108.

At step 516, it is determined if the input indicator is presented at a selectable user interface object. In one embodiment, it is determined if the input indicator is presented at display coordinates that include any selectable user interface objects that are provided by the user interface management module 122. In an exemplary embodiment, upon receiving a touch input on the touchpad 108, and presenting the input indicator at the absolute mapped position of the touch input, the coordinate display recognition module 114 communicates the display coordinates of the input indicator to the user interface management module 122. The user interface management module 122 determines if the input indicator is positioned at display coordinates wherein user interface objects are also presented on the display screen 110.

At step 518, if it is determined that the input indicator is presented at a selectable user interface object, the input indicator is utilized to select the corresponding user interface object. For example, if the input indicator is presented at a user interface object, the user interface object may be selected/inputted based on the interpretation of the touch input by the user interface management module 122. In one embodiment, the user interface management module 122 determines if the position of the input indicator presented as a user interface object is utilized to select, highlight, and/or input the user interface object based on the type of application and/or user interface corresponding to one or more vehicle systems or subsystems executed by the controller 120.

At step 520, if it is not determined that the input indicator is presented at a user interface object (at step 516), it is determined if the system 100 is in the absolute zone mapping mode. In one embodiment, the touchpad communication device 132 sends a signal to the user interface management module 122 when the user switches the touchpad 108 from the absolute coordinate mapping mode to the absolute zone mapping mode. At step 522, if the system 100 is determined to be in the absolute zone mapping mode, the user interface management module 122 creates display input zones corresponding to the position of user interface objects presented on the display screen 110.

In an exemplary embodiment, the user interface management module 122 determines display input zones by calculating display coordinates that are located within a certain measured distance from the display coordinates that include the edges of the user interface objects displayed on the display screen 404. In an alternate embodiment, the user interface management module 122 determines display input zones by calculating display coordinates that are located within a certain measured distance from the display coordinates including the center point of the user interface objects displayed on the display screen 404. In another embodiment, the user interface management module 122 may determine customized display input zones that are determined to have the highest utilization likelihood by the user based on the size, shape, and placement of one or more user interface objects displayed on the display screen 404. At step 524, the user interface management module 122 selects the corresponding user interface object that is associated to the display input zone in which the input indicator is presented (corresponding to the to the touch input).

As discussed, various embodiments of absolute zone mapping system 100 may be utilized. Also, numerous components and technologies that have not been discussed herein may be utilized to compute operations associated with the absolute zone mapping system 100. It is to be appreciated that the touchpad 108 of the absolute zone mapping system 100, may be part of the display unit 104. For example, the touchpad 108 may be overlaid upon the display screen 110 so that the surface 136 of the touchpad 108 devises a clear layer overlaying the display screen 110.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for providing absolute coordinate and zone mapping between a touchpad and a display screen which are separate and apart from one another, comprising:
   presenting a plurality of user interface objects on the display screen at a location based on a first set of display coordinates, each user interface object associated with a first shape having a first proportion;
   determining a set of active touchpad coordinates on the touchpad based on the first set of display coordinates; and
   providing a plurality of touch input zones on the touchpad, each corresponding to one of the plurality of user interface objects presented on the display screen,
   wherein each touch input zone includes a first area of a surface of the touchpad that corresponds to the set of active touchpad coordinates and a second area of the surface of the touchpad that is outside of the first area,
   wherein each of the first areas of the touch input zones are set as a second shape associated with a second proportion different than the first proportion of the first shape,
   wherein the first proportion of at least two of the plurality of user interface objects does not match the second proportion of the corresponding touch input zones by increasing the second proportion of at least one of the first areas of the touch input zones while decreasing a proportion for at least one second touch input zone;
   wherein each touch input zone of different touch input zones on the touchpad correspond to one user interface object presented on the display screen.

2. The method of claim 1, further including determining the touch input received at a portion of the surface of the touchpad and defining touchpad coordinates associated with the portion of the surface of the touchpad wherein the touch input is received.

3. The method of claim 2, further including presenting an absolute mapped position of the touch input, wherein presenting the absolute mapped position includes determining display coordinates on the display screen that correspond to the touchpad coordinates associated with the portion of the surface of the touchpad wherein the touch input is received.

4. The method of claim 3, wherein presenting the absolute mapped position of the touch input includes presenting an input indicator at a location of the display screen that includes the display coordinates on the display screen that corresponds to the touchpad coordinates associated with the portion of the surface of the touchpad wherein the touch input is received.

5. The method of claim 4, wherein determining a user input to one of the plurality of user interface objects includes determining that the input indicator is presented on the first set of display coordinates, and display coordinates on the display screen that include a plurality of display input zones, each corresponding to one of the plurality of touch input zones.

6. The method of claim 1, wherein providing the plurality of touch input zones on the touchpad, each corresponding to one of the plurality of user interface objects presented on the display screen includes determining a location of the second area of the surface of the touchpad based on a first measured distance that is determined to be the shortest from a second set of display coordinates that correspond to an edge of one of the plurality of user interface objects to a plurality of display coordinates at an edge of the display screen.

7. The method of claim 1, wherein providing the plurality of touch input zones on the touchpad, each corresponding to one of the plurality of user interface objects presented on the display screen includes determining a location of the second area of the surface of the touchpad based on a second measured distance that is determined to be the shortest from a third set of display coordinates that correspond to a center point of one of the plurality of user interface objects to a plurality of display coordinates at an edge of the display screen.

8. The method of claim 1, wherein providing the plurality of touch input zones on the touchpad, each corresponding to one of the plurality of user interface objects presented on the display screen includes determining touchpad coordinates that correspond to display coordinates that are determined to have a highest utilization likelihood, wherein the highest utilization likelihood is based on a shape and placement of each user interface object presented on the display screen.

9. A system for providing absolute coordinate and zone mapping between a touchpad and a display screen which are separate and apart from one another, comprising:
a memory storing instructions that when executed by a processor cause the processor to:
present a plurality of user interface objects on the display screen at a location based on a first set of display coordinates, each user interface object associated with a first shape having a first proportion;
determine a set of active touchpad coordinates on the touchpad based on the first set of display coordinates; and
provide a plurality of touch input zones on the touchpad, each corresponding to the one of the plurality of user interface objects presented on the display screen,
wherein each touch input zone includes a first area of a surface of the touchpad that corresponds to the set of active touchpad coordinates and a second area of the surface of the touchpad that is outside of the first area,
wherein each of the first areas of the touch input zones are set as a second shape associated with a second proportion different than the first proportion of the first shape,
wherein the first proportion of at least two of the plurality of user interface objects does not match the second proportion of the corresponding touch input zones by increasing the second proportion of at least one of the first areas of the touch input zones while decreasing a proportion for at least one second touch input zone;
wherein each touch input zone of different touch input zones on the touchpad correspond to one user interface object presented on the display screen.

10. The system of claim 9, further including determining the touch input received at a portion of the surface of the touchpad and defining touchpad coordinates associated with the portion of the surface of the touchpad wherein the touch input is received.

11. The system of claim 10, further including presenting an absolute mapped position of the touch input, wherein presenting the absolute mapped position includes determining display coordinates on the display screen that correspond to the touchpad coordinates associated with the portion of the surface of the touchpad wherein the touch input is received.

12. The system of claim 11, wherein an input indicator is presented at a location of the display screen that includes the display coordinates on the display screen that correspond to the touchpad coordinates associated with the portion of the surface of the touchpad wherein the touch input is received.

13. The system of claim 12, wherein the input indicator is presented on the first set of display coordinates, and display coordinates on the display screen that include a plurality of display input zones, each corresponding to one of the plurality of touch input zones.

14. The system of claim 9, wherein the processor determines a location of the second area of the surface of the touchpad based on a first measured distance that is determined to be the shortest from a second set of display coordinates that correspond to an edge of one of the plurality of user interface objects to a plurality of display coordinates at an edge of the display screen.

15. The system of claim 9, wherein the processor determines a location of the second area of the surface of the touchpad based on a second measured distance that is determined to be the shortest from a third set of display coordinates that correspond to a center point of one of the plurality of user interface objects to a plurality of display coordinates at an edge of the display screen.

16. The system of claim 9, wherein the processor determines touchpad coordinates that correspond to display coordinates that have a highest utilization likelihood to provide one of the plurality of touch input zones on the touchpad, wherein the highest utilization likelihood is based on a shape and placement of each user interface object presented on the display screen.

17. A non-transitory computer readable storage medium storing instructions that when executed by a processor of a computer, causes the processor of the computer to implement a method, comprising:
presenting a plurality of user interface objects on a display screen at a location based on a first set of display coordinates, each user interface object associated with a first shape having a first proportion;

determining a set of active touchpad coordinates on a touchpad based on the first set of display coordinates, wherein the touchpad and the display screen are separate and apart from one another; and providing a plurality of touch input zones on the touchpad, each corresponding to one of the plurality of user interface objects presented on the display screen, wherein each touch input zone includes a first area of a surface of the touchpad that corresponds to the set of active touchpad coordinates and a second area of the surface of the touchpad that is outside of the first area, wherein each of the first areas of the input zones are set as a second shape associated with a second proportion different than the first proportion of the first shape, wherein the first proportion of at least two of the plurality of user interface objects does not match the second proportion of the corresponding touch input zones by increasing the second proportion of at least one of the first areas of the touch input zones while decreasing a proportion for at least one second touch input zone;

wherein each touch input zone of different touch input zones on the touchpad correspond to one user interface object presented on the display screen.

18. The non-transitory computer readable storage medium of claim 17, wherein providing the plurality of touch input zones, each corresponding to one of the plurality of user interface objects presented on the display screen includes determining a location of the second area of the surface of the touchpad based on a first measured distance that is determined to be the shortest from a second set of display coordinates that correspond to an edge of one of the plurality of user interface objects to a plurality of display coordinates at an edge of the display screen.

19. The non-transitory computer readable storage medium of claim 17, wherein providing the plurality of touch input zones, each corresponding to one of the plurality of user interface objects presented on the display screen includes determining touchpad coordinates that correspond to display coordinates that are determined to have a highest utilization likelihood, wherein the highest utilization likelihood is based on a shape and placement of each user interface object presented on the display screen.

20. The non-transitory computer readable storage medium of claim 17, wherein providing the plurality of touch input zones, each corresponding to one of the plurality of user interface objects presented on the display screen includes determining a location of the second area of the surface of the touchpad based on a second measured distance that is determined to be the shortest from a third set of display coordinates that correspond to a center point of each user interface object to a plurality of display coordinates at an edge of the display screen.

* * * * *